United States Patent [19]

Mitsui et al.

[11] Patent Number: 4,554,409
[45] Date of Patent: Nov. 19, 1985

[54] METHOD OF ELECTROMAGNETICALLY READING COORDINATE DATA

[75] Inventors: Kenji Mitsui; Akira Suzuki, both of Osaka, Japan

[73] Assignee: Photoron Incorporated, Tokyo, Japan

[21] Appl. No.: 544,701

[22] Filed: Oct. 24, 1983

[30] Foreign Application Priority Data

Oct. 28, 1982 [JP] Japan ................... 57-190344

[51] Int. Cl.⁴ .............................. G08C 21/00
[52] U.S. Cl. ...................................... 178/19
[58] Field of Search ........................ 178/18, 19

[56] References Cited

U.S. PATENT DOCUMENTS

| | | | |
|---|---|---|---|
| 3,647,963 | 3/1972 | Bailey | 178/19 |
| 3,801,733 | 4/1974 | Bailey | 178/19 |
| 4,018,989 | 4/1977 | Snyder et al. | 178/18 |
| 4,088,842 | 5/1978 | Ikedo | 178/19 |
| 4,213,005 | 7/1980 | Cameron | 178/18 |
| 4,240,065 | 12/1980 | Howbrook | 340/146.3 SY |
| 4,298,772 | 11/1981 | Kobayashi et al. | 178/18 |
| 4,368,351 | 1/1983 | Zimmer | 178/19 |
| 4,418,242 | 11/1983 | Kouno | 178/19 |

Primary Examiner—Stafford D. Schreyer
Attorney, Agent, or Firm—Wenderoth, Lind & Ponack

[57] ABSTRACT

In an electromagnetic type digitizer system having a cursor coil and a tablet, the cursor position can be determined accurately by much a simplified method which basically uses a distribution curve of electromotive force induced by the cursor coil in the tablet.

7 Claims, 13 Drawing Figures

METHOD OF ELECTROMAGNETICALLY READING COORDINATE DATA

BACKGROUND OF THE INVENTION

The present invention relates generally to electromagnetically reading coordinate data to obtain digital equivalents of the data and to a digitizer system having such a function.

Figure 1:
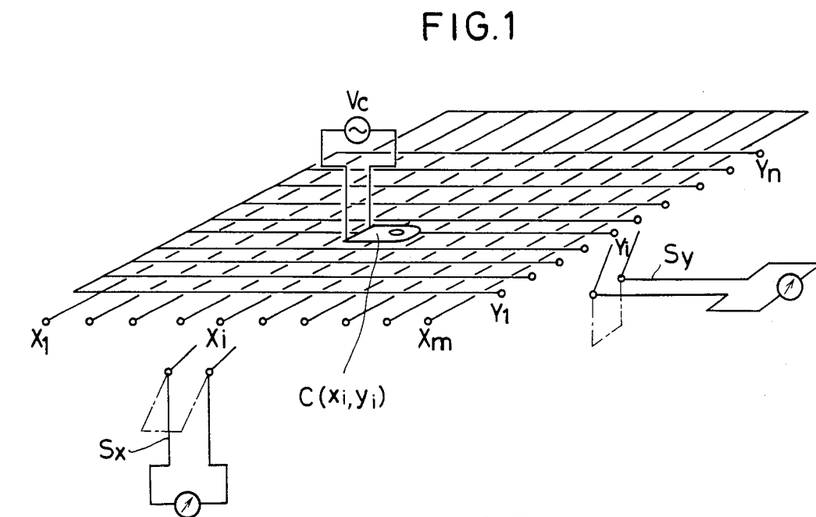
FIG. 1 is a schematic illustration of a known digitizer which is usable also for the method of the present invention.

A typical electromagnetic digitizer known heretofore comprises an exciting coil for producing an alternating magnetic field and two mutually perpendicular sets of parallel conductors arrayed like a reticulate lattice. The magnetic field induces electromotive forces in the conductors. The exciting coil (hereinafter shall be referred to as a cursor coil or simply as a coil) is housed in a cursor or stylus capsule of the digitizer movable along the surface of the lattice. The conductors in one set are electrically insulated from the other set of conductors. These conductors are embedded in a planar substrate to form a so-called tablet. The conductors of each set have their one ends electrically connected together so that m longitudinal loops $X_i$ (i=1~m) and n lateral loops $Y_j$(j=1~n) are formed by the respective adjacent conductors, as shown in FIG. 1.

To determine the position of the cursor, alternating voltage of tens Hz to several MHz is applied across the coil C housed therein to induce alternating electromotive forces in the respective loops $X_i$ and $Y_j$. The electromotive force is measured by sequentially changing over the switches $S_x$ and $S_y$ from the loops $X_1$ and $Y_1$ through to $X_m$ and $X_n$, respectively. Then, reading the address or coordinates $(x_i, y_j)$ of a pair of one $X_i$ and $Y_j$ under the highest electromotive force in each set of loops gives the position of the cursor.

In such a method, however, the positional resolution depends on the intervals between adjacent loops or conductors. Therefore, to improve the resolution, the conductors must be arrayed at correspondingly decreased intervals, or positions between adjacent conductors must be determined somehow. However, it is difficult to make the intervals narrower than about 0.5 mm in view of the manufacturing technique and cost or from a quality control aspect. Therefore, if a resolution higher than this level is required, it is necessary to determine such inter-conductor positions by some means or other. Hereinbelow, a few known solutions for determining such inter-conductor positions are described with reference to FIGS. 2, 3 and 4.

Figure 2:
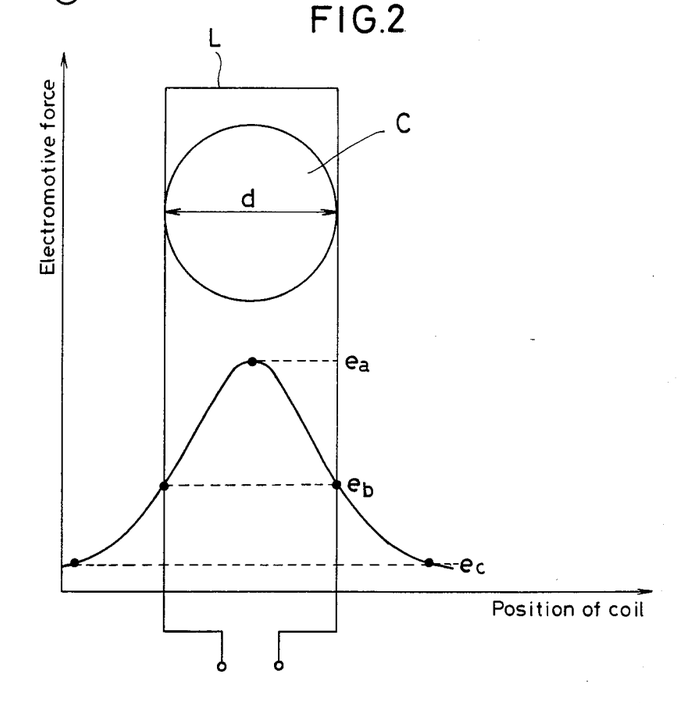
FIG. 2 shows a curve which is obtained by plotting the electromotive force induced in a loop against the position of a cursor coil relative to the loop as it moves transversely of the loop.

FIG. 2 shows typically how the peak value of alternating electromotive force induced in a loop L by a coil C changes as the coil moves transversely of the loop L. The diameter d of the coil C is almost equal to the interval between two conductors forming the loop L.

Figures 3A, 3B, 4:
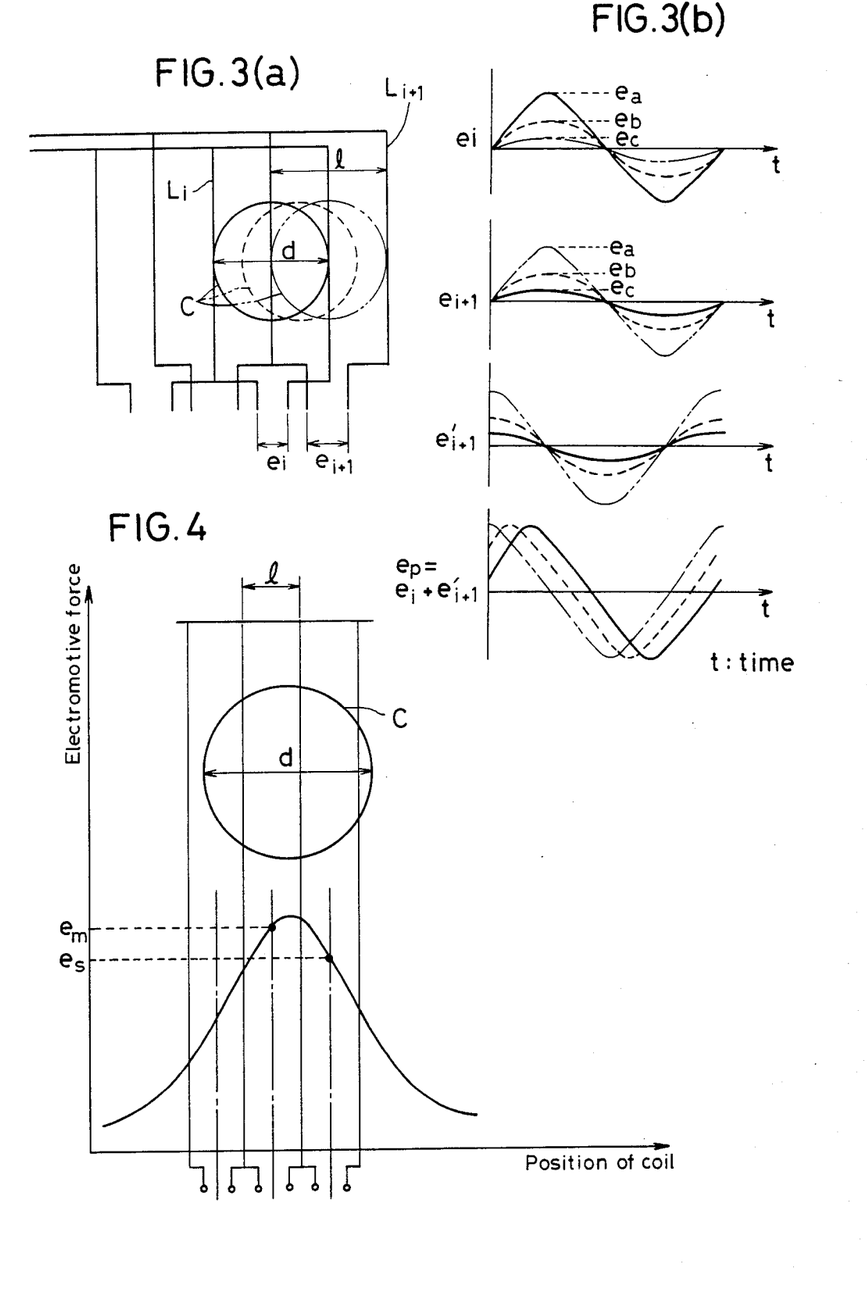
FIG. 3(a) shows schematically a cursor coil and loops of one known digitizer.
FIG. 3(b) shows waveforms of the electromotive forces appearing in the loops of FIG. 3(a)
FIG. 4 shows schematically a cursor coil and loops of another known digitizer.

To determine the position of the coil in a loop, namely, its position between two adjacent conductors forming the loop, one known method utilizes such a change in the induced electromotive force with the position of the coil relative to the loop. This method uses a tablet having its alternate conductors connected together at their one ends so that the resultant one set of loops formed of adjacent odd conductors are half-lapped over the other set of loops formed of adjacent even conductors, as shown in FIG. 3(a). If the interval between two conductors forming one loop is almost equal to the diameter of the coil C like the case of FIG. 2, the electromotive forces $e_i$ and $e_{i+1}$ induced in the loops $L_i$ and $L_{i+1}$ will have waveforms as shown in FIG. 3(b) with their peaks corresponding to $e_a$, $e_b$ or $e_c$ shown in FIG. 2, when the coil C occupies the respective positions relative to the loops $L_i$ and $L_{i+1}$ as shown in FIG. 3(a). Then, the phase of $e_{i+1}$ is advanced by 90° to obtain the waveform $e_{i+1}$, which is in turn added to $e_i$ to obtain $e_p$. The resultant waveform $e_p$ has a phase difference from the original $e_i$ or $e_{i+1}$ which varies with the position of the coil C relative to the loops $L_i$ and $L_{i+1}$. Thus, the position of the coil C can be known by determining this phase difference of $e_p$ from $e_i$ or $e_{i+1}$. With this method, however, it is difficult to achieve a high accuracy. Further, rather intricate operations are involved such as phase shift, superposition of waves and measurement of phase difference.

Alternatively, Japanese Patent Provisional Publication No. 52-96825 discloses the use of a coil having a diameter d about three times larger than the interval l between adjacent conductors as shown in FIG. 4. In this arrangement, the inter-conductor position is determined based on the finding that the ratio $e_m/e_s$ of the highest electromotive force $e_m$ to the second highest electromotive force $e_s$ among the three loops substantially covered by the coil C is a function of its inter-conductor position. However, since this function is not a linear one, complicated calculation is required, or the positional reading must be compensated by using data precollected and stored in a ROM or the like.

SUMMARY OF THE INVENTION

Accordingly, an object of the present invention is to provide a simplified method of reading coordinates with an improved accuracy.

According to the present invention, the coordinates, namely, the position of the cursor coil is determined based on the distribution of the electromotive forces induced in the conductors of the tablet, the distribution being substantially symmetrical with respect to the center of the cursor coil.

Especially, the method of the present invention permits the inter-conductor positions to be determined more accurately and simplifiedly.

These and other objects and features of the present invention will become apparent from the following description of the preferred embodiments thereof taken in connection with the accompanying drawings.

BRIEF DESCRIPTION OF THE INVENTION

DETAILED DESCRIPTION OF THE PREFERRED EMBODIMENTS

The present invention employs a digitizer having a cursor coil and a tablet. The plane of the tablet substantially represents a rectangular Cartesian coordinate system. However, since the X-axial and Y-axial positions of the cursor coil can be determined quite identically, the following description will be made only with regard to the X-axis.

Figure 5:
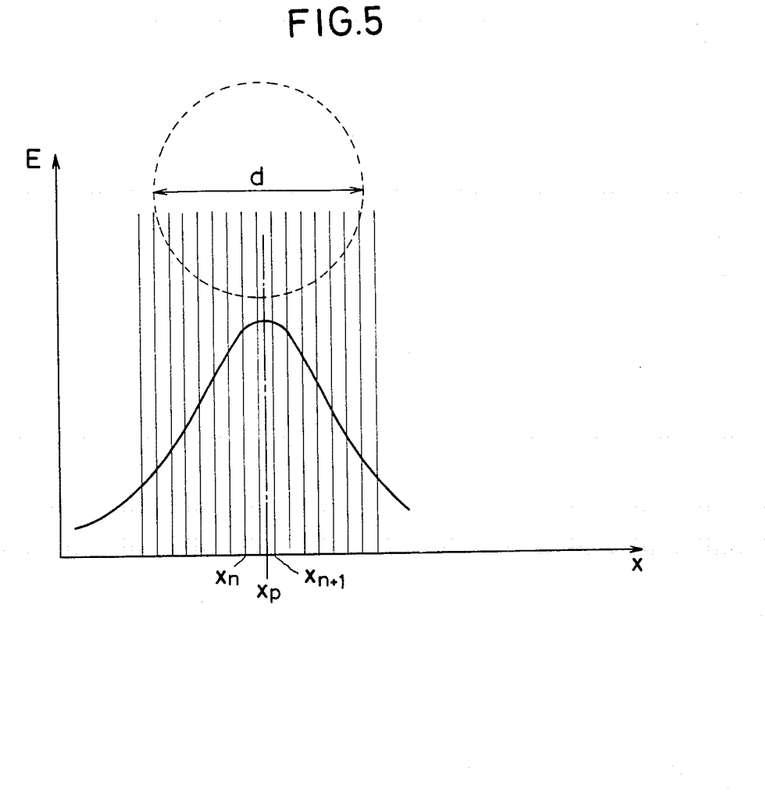
FIG. 5 shows a distribution curve of electromotive forces which is used in principle by the present invention.

Referring now to FIG. 5, the cursor coil of d in effective flux diameter produces a magnetic field over the loops arrayed in the tablet at intervals of l. In the drawing, the respective loops are represented by their center lines at $x = x_i$. The magnetic field is substantially symmetrical with respect to a vertical axis $x = x_p$ passing the center of the coil, which is unknown and here assumed to be positioned between adjacent two loops at $x = x_n$ and $x_{n+1}$. As the resolution of a digitizer generally increases with the ratio d/l, a suitable ratio may be selected depending on the resolution desired in specific cases. In the present invention, it is preferred that the ratio ranges from about 10 to 30 (namely, $10l \leq d \leq 30l$). Of course, this ratio may be smaller than 10.

Figure 6:
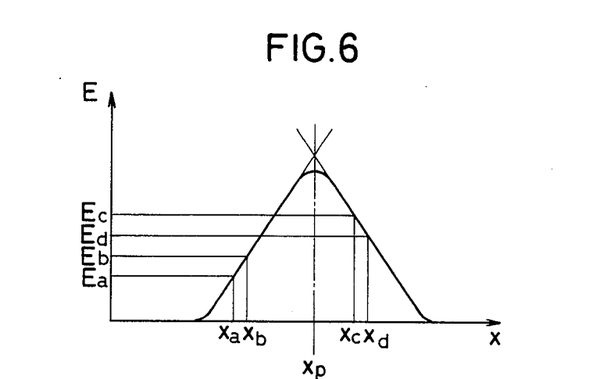
FIG. 6 shows a distribution curve used to explain one preferred method of the present invention.

Plotting the induced electromotive forces $E_i$ against $x_i$ gives an electromotive force distribution curve $E = E(x)$ as shown in FIG. 5. The $E(x)$ is also substantially symmetrical with respect to the axis $x = x_p$. To determine the position of this axis of symmetry, two loops at $x = x_a$ and $x_b (x_a < x_b)$ on the rising side of the distribution curve and another two loops at $x = x_c$ and $x_d (x_c < x_d)$ on its falling side are selected as shown in FIG. 6 so that two straight lines connecting the respective corresponding two points on $E(x)$ have an equal gradient in absolute value, namely, so that the following formula is satisfied:

$$\frac{E(x_b) - E(x_a)}{x_b - x_a} = - \frac{E(x_d) - E(x_c)}{x_d - x_c} \quad (x_b < x_c)$$

Thus, the two selected loops on one side of the curve must exist at symmetrical positions to those on the other side or the two loops on each side must correspond to a substantially linear portion of the distribution curve.

Since $E(x_i) = E_i$, $x_p$ can be determined as the abscissa of the intersection of two lines connecting $(x_a, E_a)$ and $(x_b, E_b)$, and $(x_c, E_c)$ and $(x_d, E_d)$, respectively. Thus, it can be known by solving the following equation (1):

$$\frac{E_b - E_a}{x_b - x_a}(x - x_a) + E_a = - \frac{E_b - E_a}{x_b - x_a}(x - x_c) + E_c \quad (1)$$

$$\text{Then, } x = \tfrac{1}{2}\left[(x_a + x_c) + \frac{E_c - E_a}{E_b - E_a}(x_b - x_a)\right] = x_p \quad (2)$$

If the two loops selected on the rising side of the distribution curve are adjacent ones, namely, if $x_b - x_a = l$, $x_p$ can be expressed as follows:

$$x_p = \tfrac{1}{2}\left(x_a + x_c + \frac{E_c - E_a}{E_b - E_a}l\right) \quad (3)$$

Figure 7:
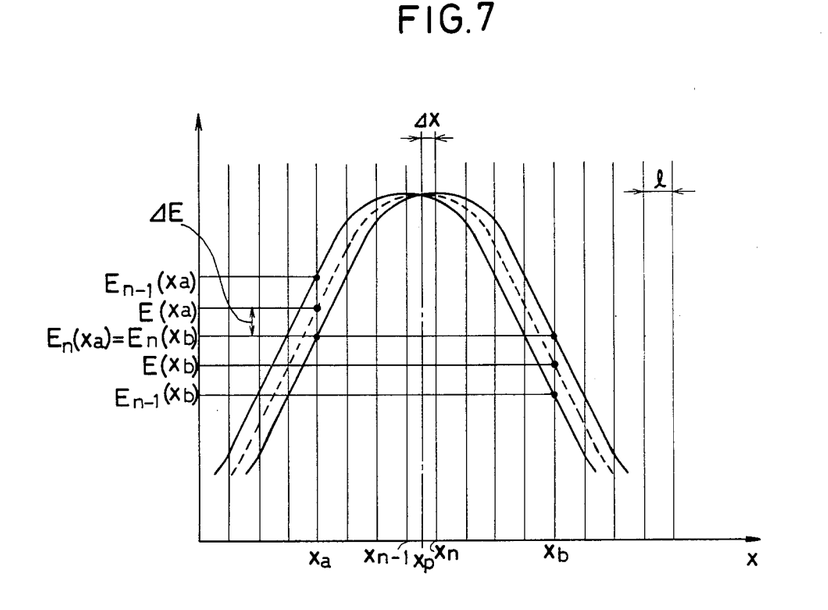
FIG. 7 shows distribution curves used to explain another preferred method of the present invention.

Another method of the present invention will be now described with reference to FIG. 7. In FIG. 7, there are shown three distribution curves $E_n(x)$, $E_{n-1}(x)$ and $E(x)$ which are obtained substantially in the same manner as the curve of FIG. 5. The curves $E_n(x)$ and $E_{n-1}(x)$ are given when the center of the cursor coil is positioned at $x = x_n$ and $x = x_{n-1}$, respectively, whereas $E(x)$ represents a distribution curve appearing when it is positioned at $x = x_p$ between $x_{n-1}$ and $x_n$ ($x_p = x_n - \Delta x$, $0 < \Delta x < l$). If selecting two loops at $x = x_a$ and $x_b$ symmetrically with respect to the axis $x = x_n$, $E_n(x_a) = E_n(x_b)$. Although the difference $\Delta E$ between $E(x_a)$ or $E(x_b)$ and $E_n(x_a)$ increases with $\Delta x$ as $E(x)$ comes close to $E_{n-1}(x)$, it is known that $E_n(x)$ and $E(x)$ approximately satisfy the following formula if they are approximately linear in the vicinity of $x = x_a$ and $x_b$.

$$2E_n(x_a) = E(x_a) + E(x_b) \quad (4)$$

$$\text{Since } \Delta E = E(x_a) - E_n(x_a), \Delta E = \tfrac{1}{2}[E(x_a) - E(x_b)] \quad (5)$$

Figure 8:
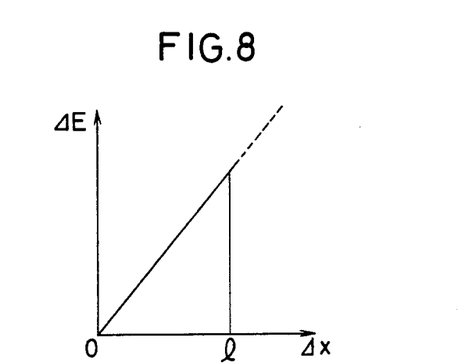
FIG. 8 shows a relationship between the coil position deviation of the cursor coil and the differential electromotive force used in the method of FIG. 7.

Since $E(x)$ varies with $\Delta x$, $\Delta E$ is a function of $\Delta x$. Meanwhile, the loops where the distribution curve $E(x)$ are substantially linear can be predetermined experimentally. That is to say, the two loops at $x = x_a$ and $x_b$ can be selected as so. Then, $\Delta E$ and $\Delta x$ substantially satisfy the following relationship, as shown in FIG. 8.

$$\Delta E = m \Delta x \quad (6)$$

where m is a constant which can also be predetermined experimentally.

Therefore, to determine $x_p$, the abscissa of the loop incurring the highest electromotive force is first determined as $X_n$. Then, measuring $E(x_a)$ and $E(x_b)$ at $x = x_a$ and $x_b$, as predetermined, gives $\Delta E$ by the foregoing formula (5), which in turn gives $\Delta x$ by the formula (6). Then, $x_p$ can be determined as follows:

$$x_p = x_n - \Delta x$$

Alternatively, $\Delta x$ may be determined based on the ratio $E(x_a)/E(x_b)$ instead of $\Delta E$ used above.

In one modified method of the present invention, suitable feedback control may be provided between the loops of the tablet and the cursor coil to control its input so that in the resultant distribution curve of electromotive forces the arithmetic mean $$\frac{E(x_a) + E(x_b)}{2}$$

is always equal to $E_n(x_a)$, which is an experimentally predeterminable constant. Then, the distribution curve $E(x)$ will have an improved linearity at $x = x_a$ and $x_b$ and the foregoing formula (6) will have an improved reliability. In this case, m can be predetermined as $$\frac{E_{n-1}(x_a) - E_n(x_a)}{l}.$$

Thus, from the formulas (5) and (6), $$\Delta x = \frac{\Delta E}{m}, \quad (7)$$

$$x_p = x_n - \frac{E(x_a) - E(x_b)}{2m}$$

Figures 9A, 9B:
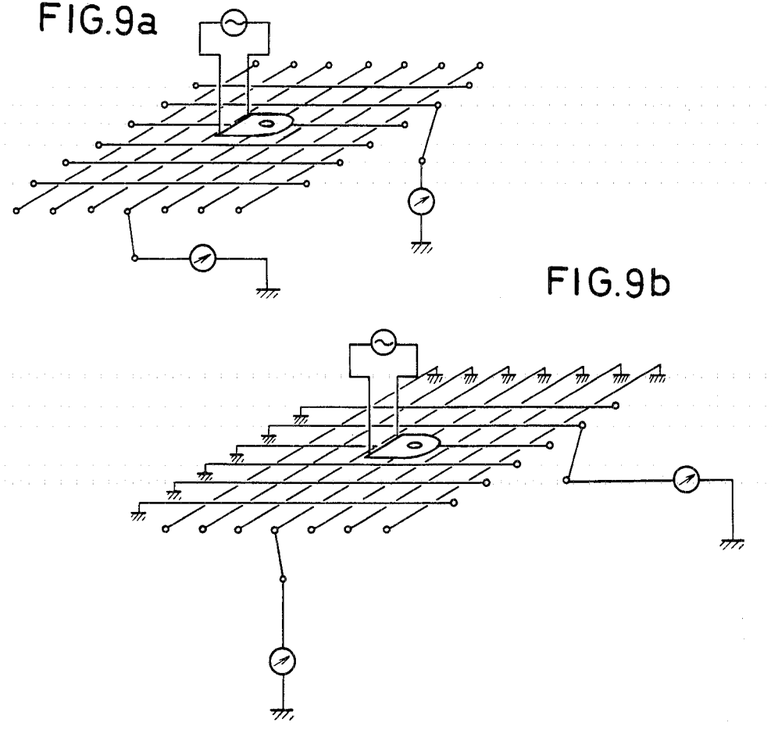
FIGS. 9(a) and 9(b) show schematically another forms of digitizer usable in the present invention.

The foregoing embodiments have used a tablet having its conductors connected together at their one ends to form loops. However, such one ends of the conductors which are not subjected to switching when measuring the electromotive forces may be left open or grounded as shown in FIG. 9(a) or 9(b).

Figure 10:
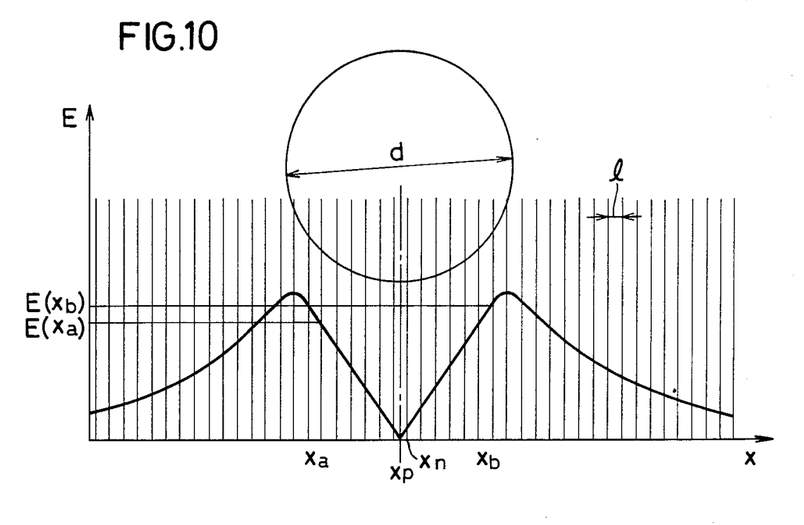
FIG. 10 shows another distribution curve of electromotive forces which is also usable in the present invention.

Further, the cursor coil and the tablet may be adapted to produce a double-peak distribution curve with each peak occurring at each end of the coil as shown in FIG. 10. In this arrangement, $E(x_a)$ and $E(x_b)$ can also satisfy the foregoing formula (6) if two loops at $x = x_a$ and $x_b$ are symmetrically selected, with respect to the loop at $x = x_n$ incurring the lowest electromotive force, at substantially linear portions of the curve $E(x)$. Further, the linearity of the curve at $x = x_a$ and $x_b$ may be improved by providing feedback control between the cursor coil and the conductors, as described previously.

Although in the embodiments described hereinbefore the distribution curve was obtained by measuring electromotive forces induced by the cursor coil in the loops or the conductors, it may be obtained by measuring the electromotive force induced in the cursor coil by sequentially excited loops or conductors.

Figure 11:
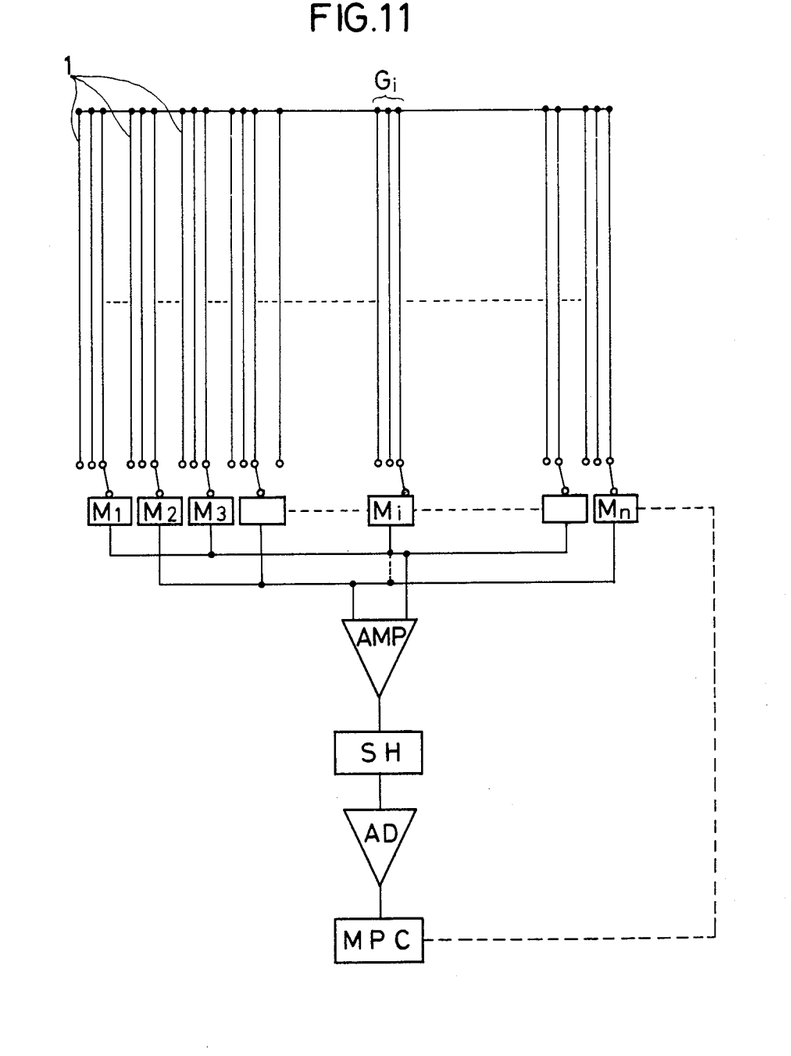
FIG. 11 is a schematic block diagram of the circuit of a digitizer used in the present invention.

The method of reading coordinates according to the present invention may be practiced as a digitizer system in the following manner, for example. FIG. 11 schematically shows such a digitizer in which the numeral 1 generally denotes conductors arrayed at constant intervals in a tablet. The conductors 1 have their one ends connected together. At their other ends, the conductors 1 are divided into several groups $G_i(i=1\sim n)$ each containing two or more same number of conductors. Each group $G_i$ is provided with a selector $M_i$ which selects at a time at most one conductor from its associated group. The selectors $M_i$ as a whole function like a multiplexor. The outputs of alternate selectors are connected together to one or the other input terminal of an amplifier AMP. In other words, the even and odd selectors have their outputs connected to one and the other input terminals of the amplifier AMP, respectively.

Further, a microprocessor MPC sequentially selects a pair of adjacent selectors so that in the selected pair the conductors at the same position are selected. Thus, the electromotive force induced by a cursor coil in a loop formed of the selected pair of conductors is fed as input to the amplifier AMP. Therefore, when sequentially selecting a pair of adjacent selectors and their conductors, the output of the amplifier AMP will give a distribution curve of electromotive forces as shown in FIG. 5. The output of the amplifier AMP is fed as its peak to the analog-digital converter AD through a sample holding circuit SH. Based on the digital input fed by the converter AD, the microprocessor performs an arithmetic operation to determine the exact position of the cursor coil in accordance with the formula (2) or (3) described previously.

In the aforementioned arrangement the microprocessor selects a next pair of adjacent selectors only when all the conductors of the currently selected pair have been subjected to measurement. However, the system may be adapted so that the microprocessor first scans all the selectors through with the respective selectors set at their fixed positions, for example, at their leftmost positions, to permit that the selection of the conductors be started just from such a pair of selectors where the scanning finds induction of a predetermined threshold electromotive force. Then the position of the cursor coil can be determined more efficiently.

Although the present invention has been described with reference to specific embodiments thereof, it will be obvious to those skill in the art that various changes and modifications may be made thereto without departing from the spirit and scope of the present invention.

What are claimed are:

1. A method of reading coordinate data using an electromagnetic digitizer system including a tablet in which two mutually perpendicular sets of parallel conductors are arrayed so as to substantially define a rectangular Cartesian coordinate system, and a cursor coil which is movable along the surface of said tablet comprising: for each axial direction of said coordinate system, supplying an alternating current to said cursor coil so that plotting electromotive forces induced in said conductors by said cursor coil against a relative position between said cursor coil and said conductors will give a substantially symmetrical distribution curve with respect to an axis of symmetry passing the center of said cursor coil, measuring said electromotive forces, and determining a position of said axis of symmetry of the basis of said distribution curve; wherein said conductors have one ends thereof connected together so that respective adjacent conductors form loops and wherein a pair of loops are selected on each side of said axis of symmetry of said distribution curve so that two straight lines connecting respective two points thereon corresponding to the selected respective pairs of loops have an equal gradient in absolute value, and a position of said axis of symmetry is determined as an intersection of said two straight lines.

2. A method of reading coordinate data using an electromagnetic digitizer system including a tablet in which two mutually perpendicular sets of parallel conductors are arrayed so as to substantially define a rectangular Cartesian coordinate system, and a cursor coil which is movable along the surface of said tablet comprising: for each axial direction of said coordinate system, supplying an alternating current to said cursor coil so that plotting electromotive forces induced in said conductors by said cursor coil against a relative position between said cursor coil and said conductors will give a substantially symmetrical distribution curve with respect to an axis of symmetry passing the center of said cursor coil, measuring said electromotive forces, and determining a position of said axis of symmetry on the basis of said distribution curve; wherein said conductors have one ends thereof connected together so that the respective adjacent conductors form loops and wherein one loop is selected on each side of said axis of symmetry at such positions equally spaced apart form a loop close to said axis incurring the highest electromotive force, and the position of said axis of symmetry is determined by measuring a differential electromotive force between two selected loops and applying the resultant differential electromotive force to a function experimentally predetermined between the differential electromotive force and said relative position.

3. The method according to claim 2, wherein said resultant differential electromotive force is compared with precollected data representing said function.

4. A method of reading coordinate data using an electromotive digitizer system including a tablet in which two mutually perpendicular sets of parallel conductors are arrayed so as to substantially define a rectangular Cartesian coordinate system, and a cursor coil which is movable along the surface of said tablet comprising: for each axial direction of said coordinate system, supplying an alternating current to said cursor coil so that plotting electromotive forces induced in said conductors by said cursor coil against a relative position between said cursor coil and said conductors will give a substantially symmetrical distribution curve with respect to an axis of symmetry passing the center of said cursor coil, measuring said electromotive forces, and determining a position of said axis of symmetry on the basis of said distribution curve; wherein said conductors have one ends thereof connected together to that respective adjacent conductors form loops and wherein feedback control is provided between said loops and said cursor coil so that a sum of electromotive forces in two loops, which are selected one on each side of said axis of symmetry at such positions equally spaced apart from a loop incurring a highest electromotive force, is always kept constant.

5. A method of reading coordinate data using an electromotive digitizer system including a tablet in which two mutually perpendicular sets of parallel conductors are arrayed so as to substantially define a rectangular Cartesian coordinate system, and a cursor coil which is movable along the surface of said tablet comprising: for each axial direction of said coordinate system, supplying an alternating current to said cursor coil so that plotting electromotive forces induced in said conductors by said cursor coil against a relative position between said cursor coil and said conductors will give a substantially symmetrical distribution curve with respect to an axis of symmetry passing the center of said cursor coil, measuring said electromotive forces, and determining a position of said axis of symmetry on the basis of said distribution curve; wherein said cursor coil and said tablet are adapted so as to produce a double-peak distribution curve symmetrical with respect to said axis of symmetry, and wherein one conductor is selected on each side of said axis of symmetry at such positions equally spaced apart from a conductor close to said axis of symmetry incurring a lowest electromotive force, and a position of said axis of symmetry is determined by measuring a differential electromotive force between the two selected loops and applying the resultant differential electromotive force to a function predetermined between the electromotive force and said relative position.

6. The method according to claim 5, wherein said resultant differential electromotive force is compared with precollected data representing said function.

7. The method according to claim 5, wherein feedback control is provided between said conductors and said cursor coil so that the sum of electromotive forces in said selected two conductors is always kept constant.

* * * * *